United States Patent
Van Den Enden et al.

(10) Patent No.: US 6,181,658 B1
(45) Date of Patent: Jan. 30, 2001

(54) OPTICAL RECORD CARRIER AND APPARATUS FOR SCANNING SUCH A RECORD CARRIER

(75) Inventors: Gijsbert J. Van Den Enden; Kornelis A. Schouhamer Immink, both of Eindhoven (NL)

(73) Assignee: U.S. Philips Corporation, New York, NY (US)

( * ) Notice: Under 35 U.S.C. 154(b), the term of this patent shall be extended for 0 days.

(21) Appl. No.: 09/086,695

(22) Filed: May 29, 1998

(30) Foreign Application Priority Data

Jun. 4, 1997 (EP) .................................................. 97201679

(51) Int. Cl.$^7$ ........................................................ G11B 7/00
(52) U.S. Cl. .................................................. 369/59; 369/47
(58) Field of Search ...................... 369/44.26, 44.34, 369/59, 58, 54, 47, 275.1, 275.3, 275.4

(56) References Cited

U.S. PATENT DOCUMENTS

| | | | |
|---|---|---|---|
| 4,057,833 | 11/1977 | Braat | 358/128 |
| 5,852,599 | * 12/1998 | Fuji | 369/275.4 |
| 5,930,222 | * 7/1999 | Yoshida et al. | 369/44.26 |
| 5,940,364 | * 8/1999 | Ogata et al. | 369/275.4 |

FOREIGN PATENT DOCUMENTS 6-338066   12/1994   (JP) .

\* cited by examiner

*Primary Examiner*—Thang V. Tran
(74) *Attorney, Agent, or Firm*—Michael E. Belk

(57) ABSTRACT

An optical record carrier comprises a recording layer for recording information in a pattern of optically detectable marks in substantially parallel tracks. The tracks comprise alternating first and second servo tracks. The servo tracks have a track modulation different from the information pattern and indicative of position information. The position information in the first servo tracks, is encoded into m first words of channel bits and the position information in the second servo track, is encoded into n second words of channel bits where m and n are integers, and substantially all first and second words are different.

11 Claims, 4 Drawing Sheets

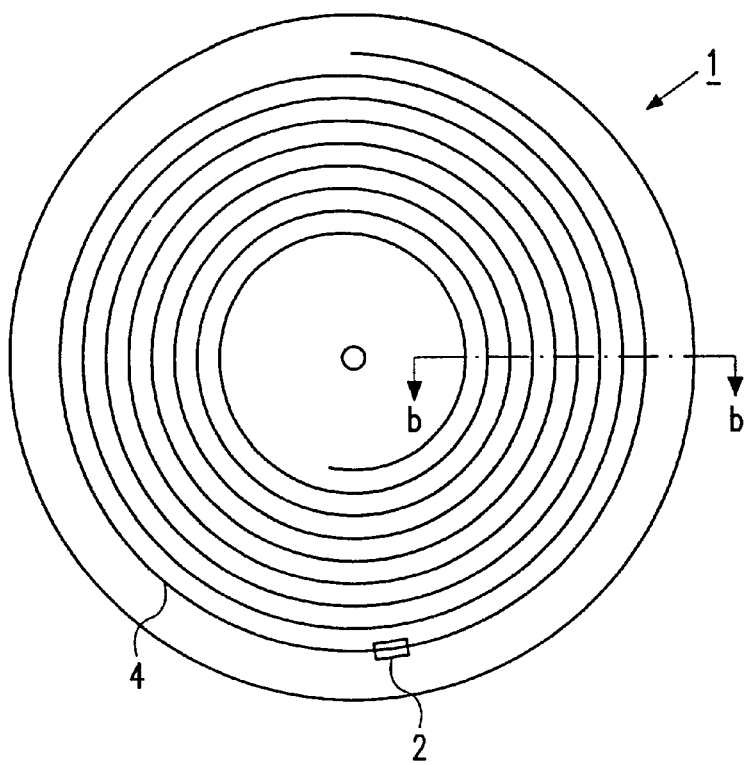
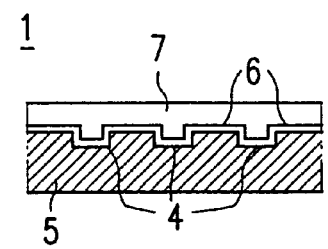
FIG. 1b
FIG. 1a
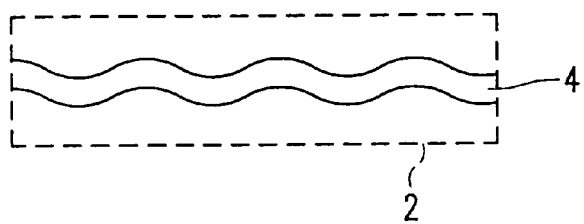
FIG. 1c
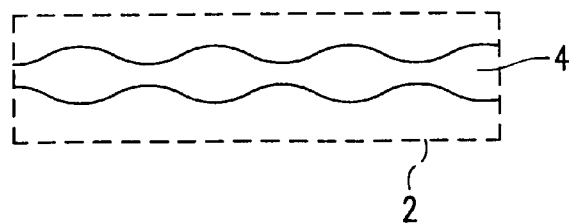
FIG. 1d

OPTICAL RECORD CARRIER AND APPARATUS FOR SCANNING SUCH A RECORD CARRIER

FIELD OF THE INVENTION

The invention relates to an optical record carrier comprising a recording layer for recording information in a pattern of optically detectable marks in substantially parallel tracks, the tracks comprising alternating first and second servo tracks, the servo tracks having a track modulation different from the information pattern and indicative of position information.

The invention also relates to a method of scanning a record carrier having substantially parallel tracks, the tracks comprising alternating first and second servo tracks, the servo tracks having a track modulation different from the information pattern and indicative of position information.

The invention further relates to an apparatus for scanning said record carrier, comprising an optical system for scanning first and second servo tracks having a track modulation by a radiation beam, a detector for detecting the radiation beam coming from the record carrier and modulated by the track modulation, and a signal processor for deriving a position-information signal from an output signal of the detector.

The invention additionally relates to an apparatus for manufacturing said record carrier, comprising an optical system for scanning a radiation-sensitive layer of a record carrier by a radiation beam along a path corresponding to the servo tracks to be formed and a modulation unit for modulating the radiation beam in such a way that the pattern formed by the radiation beam in the radiation-sensitive layer corresponds to a control signal applied to the modulation unit.

BACKGROUND OF THE INVENTION

A track is a line on the record carrier to be followed by a scanning device and having a length of the order of a characteristic dimension of the record carrier. A track on a rectangular record carrier may have a length substantially equal to the length or width of the record carrier. A track on a disc-shaped record carrier is a 360° turn of a continuous spiral line or a circular line on the disc.

This type of record carrier including associated apparatuses is known from the Japanese patent application no. 06338066. The record carrier described therein comprises first and second alternating servo tracks in the form of adjacent grooves in a substrate. The first servo tracks are frequency modulated at a relatively low frequency, the second servo tracks are frequency modulated at a relatively high frequency. On scanning the record carrier, the scanning device switches between the low and high frequency when changing from one servo track to the next servo track.

The conventional record carrier has the disadvantage that the two frequencies must have a relatively large difference, or frequency guard space, to be able to separate them in the scanning device and thereby create a low cross-talk between the servo tracks. Hence, the total bandwidth of the low-frequency range, the guard space and the high-frequency range is relatively large. However, the total bandwidth should be small to avoid interference with the information recorded in the marks. Moreover, a frequency-modulated signal gives more triangle noise at increasing frequency, making it necessary to increase the bandwidth of the high-frequency range or increase its track modulation to reduce the noise.

SUMMARY OF THE INVENTION

It is an object of the invention to provide a record carrier, scanning method and associated apparatuses that allow equal information densities in the servo tracks while keeping the crosstalk at a low level.

In accordance with an aspect of the invention, the record carrier as described in the opening paragraph is characterized in that the position information in the first servo tracks is encoded into a group of m first words of channel bits and the position information in the second servo track is encoded into a different group of n second words of channel bits, where m and n are integers, all first words are different and all second words are different.

In accordance with another aspect of the invention, the method as described in the opening paragraph is characterized in that, when scanning the first servo track, the position information is derived from the modulation of the first servo track in which the position information is encoded into a group of m different first words of channel bits, when scanning the second servo track, the position information is derived from the modulation of the second servo track in which the position information is encoded into a different group of n second words of channel bits, where m and n are integers.

In accordance with a further aspect of the invention, the scanning apparatus as described in the opening paragraph is characterized in that the signal processor comprises a demodulator for recovering a channel-bit pattern from the output signal of the detector, and a decoder for deriving the position-information signal by decoding the channel-bit pattern according to a group of first code words or a different group of second code words, depending on whether one of the first or second servo tracks is being scanned.

In accordance with a still further aspect of the invention, the apparatus for manufacturing the record carrier comprises an encoder for encoding position information to a channel-bit pattern according to a group of first words or a different group of second words, the first and second words being used for alternating servo tracks, and also comprises a modulator for deriving the control signal from the channel-bit pattern.

The use of two different groups of words, or two different code tables, for encoding position information for neighbouring servo tracks reduces the crosstalk between servo tracks. When scanning a first servo track, the code words in the channel bit stream must appear in the first code table. Since the information in neighbouring servo tracks is coded in words from a different code table, crosstalk in a detector signal from these servo tracks can easily be distinguished from the detector signal from the servo track being followed. The invention reduces the bandwidth of the track modulation as compared to the bandwidth used in the mentioned prior art by a factor of three and provides a significantly better signal-to-noise ratio. Since the number of channel bits in each code word can be chosen equal for both the first and second servo track, the information density in the servo tracks can be made substantially equal. A simplification of the coding is obtained by choosing the number of words m and n in the code tables to be equal.

The two groups of code words must be different. In the preferred embodiment the m words of one group should not appear among the n words of the other group or vice versa. However, it is possible to have one or more words appear in both groups. Preferably, all words in the groups are different, which reduces the crosstalk for all words in the servo tracks. For coding purposes an identification pattern and a synchronisation pattern are not regarded as code words and may be identical in neighbouring servo tracks. Such patterns are preferably aligned in neighbouring servo tracks.

The encoding of position information using different code tables for neighbouring tracks can advantageously be used in record carriers in which the tracks form a repeated succession of a first servo tracks, a non-servo track, a second servo tracks and a non-servo track. A non-servo track does not comprise its own position information, and a scanning device scanning over such a non-servo track should derive the position information from one or both of the neighbouring servo tracks. When scanning a first or second servo track, a scanning device preferably reads the information stored in that track and uses the appropriate code table to decode the channel bits into information. When scanning a non-servo track, the scanning device may either read the position information from one neighbouring servo track, from the other neighbouring servo track, or from both neighbouring servo tracks.

A scanning device may read the neighbouring servo track by means of a special detector which picks up mainly the modulation from one of the neighbouring servo tracks. The crosstalk from the other servo track is higher when scanning a non-servo track than when scanning a servo track. Therefore, it is also more advantageous to use the two table encoding of the position information according to the invention to reduce the crosstalk.

Alternatively, a scanning device having a suitably adapted detector may read two neighbouring servo tracks simultaneously when scanning the in between non-servo track. The encoding of the information in the two servo tracks is preferably chosen such that the information stored in both servo tracks can be recovered. For that purpose, any combination of one of the m words in the one servo track and one of the n words in the other servo track must result in a unique channel bit pattern. The encoding of the information in the two servo tracks may also be chosen such that some redundancy is added to the two code tables, resulting in additional combinations of channel bit patterns when reading a non-servo track. This redundancy may be used to store position information for the non-servo track being scanned. This third stream of position information is specific for the non-servo track and encoded in the neighbouring servo tracks.

In a preferred embodiment each word in the two code tables comprises at least two channel bits. The feature of two channel bits allows the assignment of four unique words to one bit of the position information. Each logical value of a position-information bit has preferably assigned to it two unique words, one for being recording in first servo tracks, the other for being recording in second servo tracks. Hence, the values of the integers m and n are preferably equal to two.

Each logical value of a channel bit is preferably represented by a unique track modulation pattern, for instance in the form of a track wobble, independent of the first or second servo track. When the modulation pattern for a channel bit is the same for both servo tracks, the generator of the modulation pattern, which controls the writing of servo track during the manufacture of a record carrier, can be simplified. It also allows simplification of the demodulation of detector signals when scanning a servo track.

The track modulation pattern is preferably a sinusoidal variation of at least one period of either position, width or depth of the servo track or a combination thereof. In an advantageous embodiment the values of a channel bit are represented by the phase of the variation with respect to clock marks embedded in the track modulation. When using a two-valued channel bit, the modulation pattern for one value is preferably one or more periods of a sinewave and for the other value one or more periods of a 180° phase-shifted sinewave.

BRIEF DESCRIPTION OF THE DRAWINGS

The objects, advantages and features of the invention will be apparent from the following more particular description of preferred embodiments of the invention, as illustrated in the accompanying drawings, in which FIG. 1a through d show embodiments of the record carrier in accordance with the invention.

DETAILED DESCRIPTION OF THE PREFERRED EMBODIMENT

Figure 2:
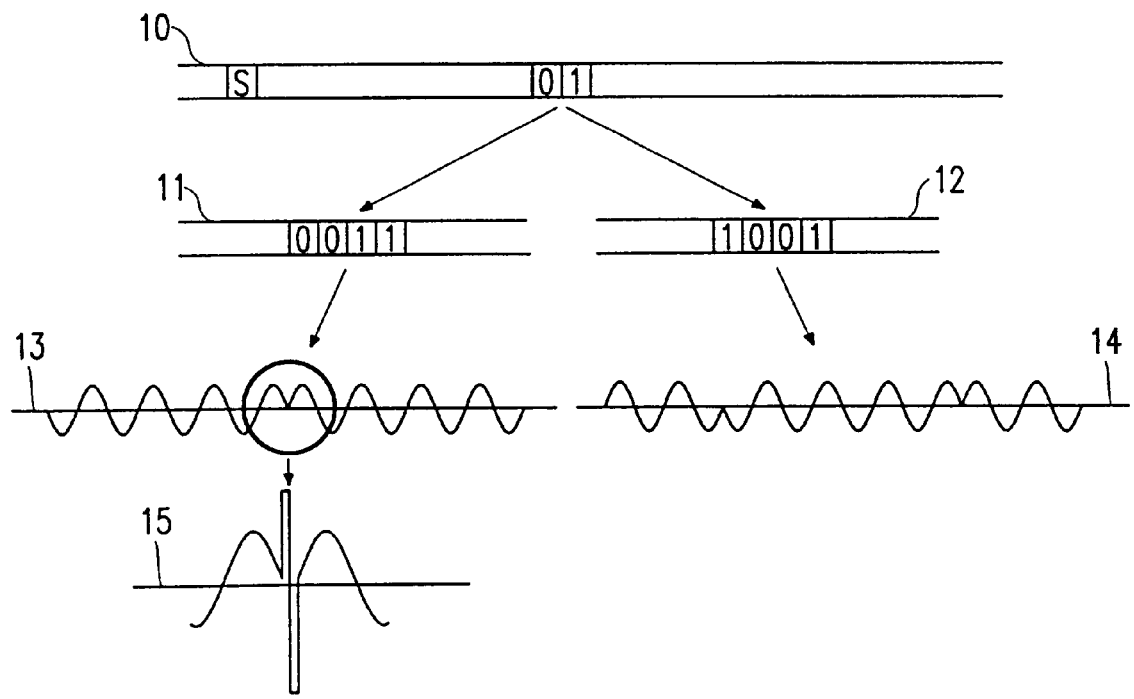
FIG. 2 shows a patterns of information bits and channel bits and track modulation curves.

FIG. 1 shows embodiments of a record carrier 1, FIG. 1a being a plan view, FIG. 1b showing a small part in a sectional view taken on the line b—b, and FIG. 1c and FIG. 1d being plan views showing a portion 2 of a first and second embodiment of the record carrier 1 to a highly enlarged scale. The record carrier 1 comprises a series of servo tracks, each forming a 360° turn of a spiral line, of which some eight are shown in the Figure. The servo tracks are constituted, for example, by preformed grooves or ridges. The servo tracks are intended for recording a position information signal. For the purpose of recording information the record carrier 1 comprises a recording layer 6, which is deposited on a transparent substrate 5 and which is covered by a protective coating 7. The recording layer is made of a radiation-sensitive material which, if exposed to suitable radiation, is subjected to an optically detectable change. Such a layer may be, for example, a thin layer of material such as tellurium, which changes reflection upon heating by a radiation beam. The layer may alternatively consist of magneto-optic or phase-change materials, which change direction of magnetization or crystalline structure, respectively, upon heating. When the tracks are scanned by a radiation beam whose intensity is modulated in conformity with the information to be recorded, an information pattern of optically detectable marks is obtained, which pattern is representative of the information. In a non-recordable, read-only record carrier the layer 6 may be a reflective layer, for example made from a metal such as aluminum or silver. The information in such a record carrier is prerecorded in the record carrier during its manufacture, for example in the form of embossed pits.

In order to determine the position of the track portion being scanned relative to the beginning of a reference servo track, position information is recorded by means of a preformed track modulation, suitably in the form of a sinusoidal track-position wobble as shown in FIG. 1c, in which the radial position of the track centre is wobbled. However, other track modulations such as, for example track-width modulation (FIG. 1d), are also suitable. Since a track-position wobble is simple to realise during the manufacture of the record carrier, a track modulation in the form of a track-position wobble is to be preferred.

It is to be noted that in FIG. 1 the track modulation has been exaggerated strongly. In reality, a wobble having an amplitude of approximately $20 \cdot 10^{-9}$ meter in the case of a track width of $400 \cdot 10^{-9}$ has been found to be adequate for a reliable detection of the radiation-beam modulation. A small amplitude of the wobble has the advantage that the distance between adjacent servo tracks can be small.

In a special embodiment of the record carrier according to the invention, the position information stored in the servo tracks is divided into servo segments of 48 binary bits. The first bit of a servo segment represents a synchronisation pattern used for synchronisation of the position information. The next four bits represent the layer number of the record carrier. The number indicates the ordinal number of the recording layer in a record carrier having a plurality of superposed recording layers. The next three bits of the servo segment represent the segment number in a track. A servo track is divided into eight radially aligned servo segments. The next 16 bits represent the track number of the servo track. The inner-most servo track on the record carrier has track number 0. The last 24 bits of a servo segment represent three parity bytes used for error correction of the position information.

FIG. 2 shows the way in which position information is encoded and modulated to wobble of the servo track. The position information is represented as a pattern 10, showing a synchronisation pattern S and, at an arbitrary location, a logical '0' and '1'. An information bit of the position information is encoded to one word of two channel bits according to Table I. The position information in the first and second servo track is encoded into two first words of channel bits and two second words of channel bits, respectively. The four first and second words are different from one another.

TABLE I

| servo track | information bit | channel bits | servo track modulation |
|---|---|---|---|
| first | 0 | 00 | −1, −1 |
|  | 1 | 11 | +1, +1 |
| second | 0 | 10 | +1, −1 |
|  | 1 | 01 | −1, +1 |

The pattern of channel bits for the first servo tracks corresponding to the information bit values '01' is shown as pattern 11 in FIG. 2, comprising the channel bit values '0011'. The corresponding pattern for the second servo tracks is shown in pattern 12, comprising the channel bit values '1001'.

A logical '0' channel bit is represented on the record carrier by two periods of a 180° phase-shifted sinusoidal track-position variation, as shown by curve 13 of the modulation of the first servo tracks. A logical '1' channel bit is represented by two periods of a non-phase-shifted sinusoidal track-position variation. The '0011' channel bit pattern of the first servo track is now represented by four periods of a 180° phase-shifted sinewave, followed by four periods of a non-phase-shifted sinewave, as shown by curve 13. The second servo tracks use the same conversion from channel bits to modulation. The resulting track modulation is shown by the curve 14. Two periods of non-phase shifted sinewave are indicated in Table I by '+1', two periods of 180° phase shifted sinewave by '−1'.

The synchronisation patterns S have the unique modulation pattern of one non-phase-shifted period followed by one 180° phase-shifted period of a sinewave.

The phase-shift of the track modulation may be derived from the phase relation between the track modulation and clock marks. The clock marks are relatively fast track modulations used for timing purposes. The clock marks are multiplexed on the track wobble as shown by curve 15. The clock mark is preferably located at a transition between two channel bits. There are 16 clock marks in a servo segment, radially aligned on the record carrier. In other embodiments of the record carrier, the clock marks may have a constant linear density or may vary stepwise in density on a type of medium usually called a zoned constant angular velocity (ZCAV) medium.

Figure 3:
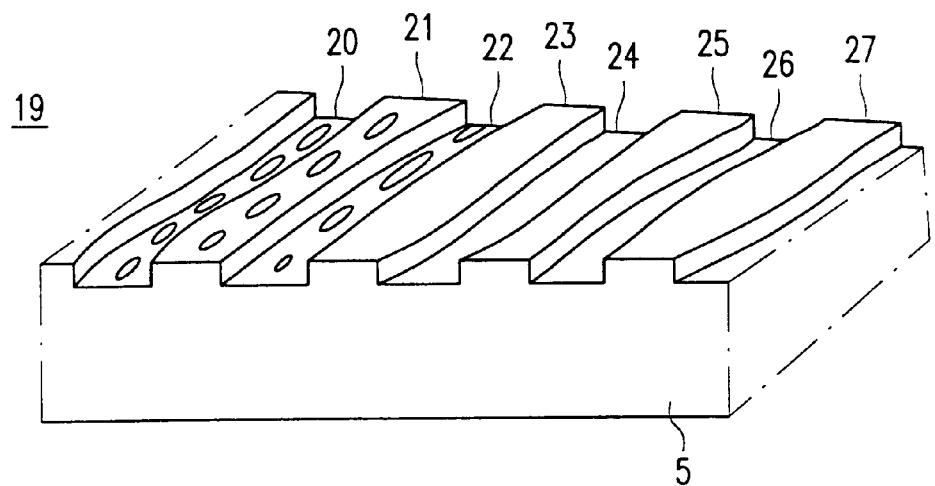
FIG. 3 shows a perspective view of a record carrier in accordance with the invention, FIG. 4a and b show two neighbouring tracks and the resulting detector signals with constructive interference (a) and destructive interference (b)

FIG. 3 shows a perspective view of a cross-section of a record carrier 19 according to the invention, having a plurality of groups of four tracks, of which two are shown. Each group comprises a first servo track 20, a non-servo track 21, a second servo track 22 and a non-servo track 23. The tracks 24, 25, 26 and 27 form an adjacent group of similar tracks. Information patterns of recording marks have been indicated schematically in the tracks 20, 21 and 22. The servo tracks 20 and 22 have been provided with position information according to the coding and modulation scheme discussed with reference to FIG. 2. A scanning device suitable for scanning such a record carrier is able to guide a radiation spot both along the centre of a groove and along the centre of a land in between two grooves. When scanning along a servo track, i.e. a groove in FIG. 3, the scanning device can read, write and/or erase information in the groove, while obtaining position information from the groove wobble. The groove wobble is read by means of a method usually called the push-pull method, known from inter alia the American patent no. U.S. Pat. No. 4,057,833. When scanning along a non-servo track, i.e. a land in FIG. 3, the device can write, read and/or erase information on the land. However, the position information cannot be obtained in the same manner as when scanning in a groove, because the groove edges on both sides of the land have in general different modulations.

Figure 4A:
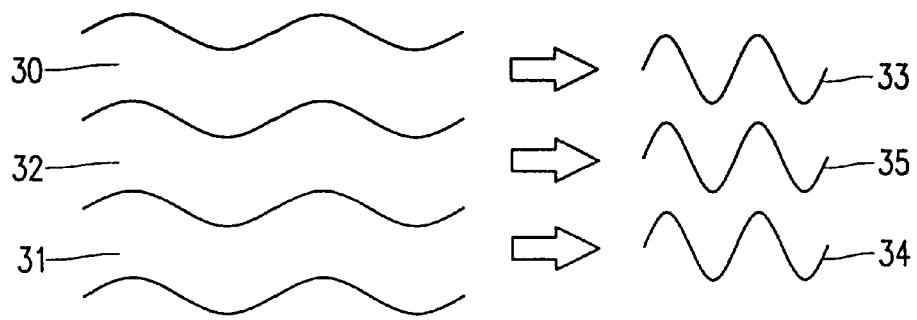
Figure 4B:
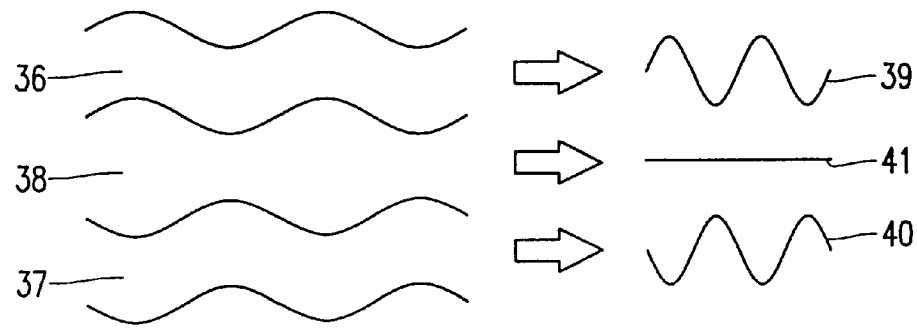

According to the invention, the encoding and modulation of the grooves is chosen such that on land the position information from both neighbouring grooves can be read. The push-pull detection signal on land will show three different signal patterns dependent on the modulation of the neighbouring servo tracks due to constructive and destructive interference. FIG. 4a shows two neighbouring servo tracks in the form of grooves 30 and 31, both modulated with a non-shifted sinewave. The push-pull detector signal from the servo tracks are shown as curves 33 and 34. On the non-servo track 32 in between the two servo tracks the push-pull detector signal will also be a non-phase-shifted sinewave 35 because of constructive interference. Likewise, if both servo tracks are modulated with a phase-shifted sinewave, the push-pull detector signal in between the two servo tracks will also be a phase-shifted sinewave. FIG. 4b shows two neighbouring servo tracks 36 and 37, the first one modulated with a non-phase-shifted sinewave and the other with a 180° phase-shifted sinewave. The push-pull detector signals 39 and 40 of the servo tracks have a mutual phase shift of 180°. The push-pull detector signal on the non-servo track 38 in between the servo tracks 36 and 37 will be zero because of destructive interference. Table II shows the non-servo track modulation obtained for the different combinations of information bits in the first and second servo track. The value pairs of the modulation in Table II can be regarded as a code word of two three-valued channel bits. From the table it is clear that the value of the information bit in each of the servo tracks can be recovered from each pair of modulations detected in the non-servo track. In fact, Table II is a code table for decoding the possible three-valued words to information bits in the first and second servo track.

TABLE II

| information bit in first servo track | information bit in second servo track | non-servo track modulation |
|---|---|---|
| 0 | 0 | 0, −1 |
| 0 | 1 | −1, 0 |
| 1 | 0 | +1, 0 |
| 1 | 1 | 0, +1 |

Figure 5:
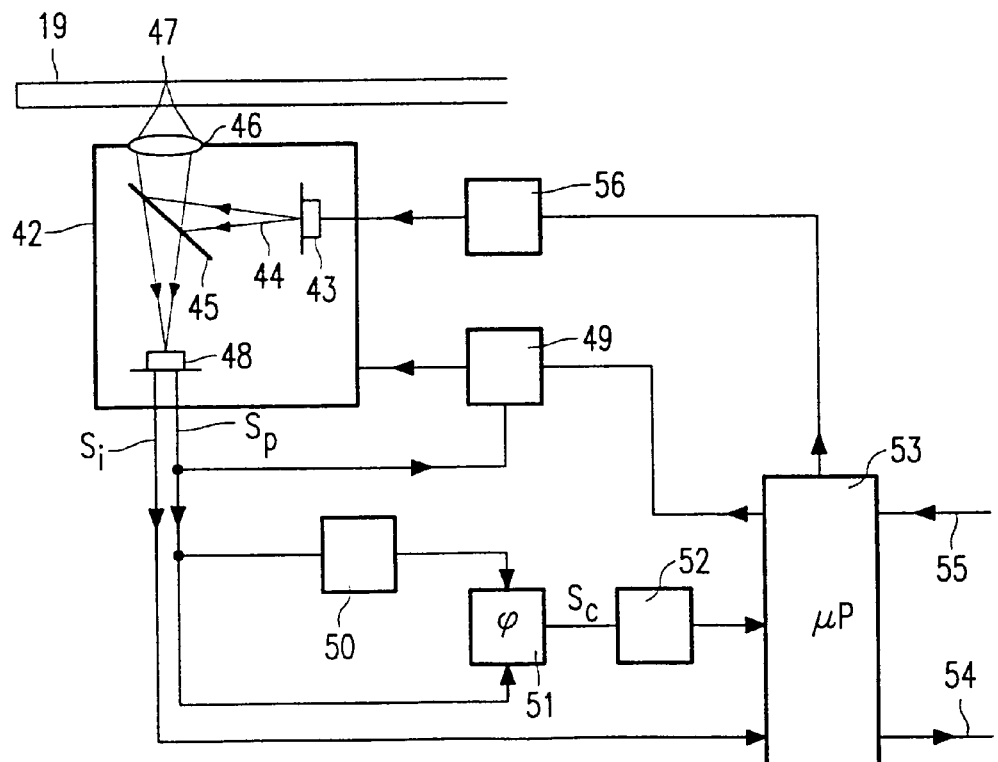
FIG. 5 shows a scanning device according to the invention.

FIG. 5 shows an apparatus for scanning a record carrier as shown in FIG. 3. The apparatus comprises an optical system 42 for optically scanning tracks in the record carrier 19. The optical system 42 comprises a radiation source 43, for example a semiconductor laser. The radiation source 43 emits a radiation beam 44, which is reflected by the beam splitter 45 and converged by an objective lens 46 to a radiation spot 47 on the tracks in an information layer of the record carrier 19. Radiation reflected from the record carrier is guided to a detector through the objective lens 46 and the beam splitter 45 to a detector 48. The detector is a split-detector having a dividing line between the two halves of the detector running parallel to the direction of the tracks being scanned. The sum signal of the two halves, usually called the central aperture signal, represents the information recorded in the tracks and is output as signal $S_i$. The difference signal of the two halves forms a signal, usually called the push-pull signal, represents the position information and servo information recorded in the tracks, and is output as signal $S_p$. The low-frequency content of the signal $S_p$ represents the servo information, indicating the position of the radiation spot 47 with respect to the centre-line of the track being scanned. The signal $S_i$ is used as input for a servo circuit 49, which controls the position of the radiation spot in a direction perpendicular to the direction of the track. The servo circuit 49 controls the position of the optical system 42 and/or the position of the objective lens 46 within optical system.

It is remarked that a signal can be obtained from a single detector half which represents the modulation of one of the neighbouring servo tracks when scanning a non-servo track. The other detector half gives then a signal representing the modulation of the other neighbouring servo track. If the width instead of the position of the servo track is modulated, the central aperture signal represents the track modulation. Since this modulation has a lower frequency than the signal due to recording marks also detected in the central aperture signal, it can easily be filtered out of the central aperture signal.

The signal $S_p$ is fed into a signal processor comprising circuits 50, 51 and 52. A clock extractor 50 derives a clock signal from the clock marks in the position information. The phase difference between the clock signal and the signal $S_p$ is determined in a phase comparator 51, operating as a demodulator. The value of the output signal of the phase comparator can represent the following occurrences: two periods of a sinewave not phase-shifted with respect to the clock signal, indicated by the logical value '+1', two periods of a sinewave phase-shifted over 180° with respect to the clock signal, indicated by '+1', a constant signal value during two periods, indicated by '0', and one period of a non-phase shifted sinewave and one period of a 180° phase-shifted sinewave, indicated by 'S' for synchronisation pattern. The output signal $S_c$ of the phase comparator 51 represents a stream of channel bits representing the position information of the track being scanned.

A decoder 52 decodes the channel bit pattern output from the phase comparator into information bits. The code table used for the decoding is given in Table III. When scanning a first servo track, the decoder uses a first group of code words indicated in Table III by the numbers 1 and 2. When scanning a second servo track, the decoder uses a second group of code words indicated in Table III by the numbers 3 and 4. The bits of the code words 1 to 4 are two-valued. When scanning a non-servo track, the decoder uses a third group of code words indicated in Table III by 5 to 8. The bits of the code words 5 to 8 are three-valued.

TABLE III

| no. | track modulation | information bit in first servo track | information bit in second servo track |
|---|---|---|---|
| 1 | −1, −1 | 0 | |
| 2 | +1, +1 | 1 | |
| 3 | +1, −1 | | 0 |
| 4 | −1, +1 | | 1 |
| 5 | 0, −1 | 0 | 0 |
| 6 | −1, 0 | 0 | 1 |
| 7 | +1, 0 | 1 | 0 |
| 8 | 0, +1 | 1 | 1 |

The output signal of the decoder 52 is the position-information signal, which is fed into a micro-processor 53, as shown in FIG. 5. The micro-processor can derive, for example, the current position of the radiation spot 47 on the record carrier 19 from the position-information signal. During reading, erasing or writing, the micro-processor can compare the current position with a desired position and determine the parameters for a jump of the optical system to the required position. The parameters for the jump are fed into the servo circuit 49. The information signal $S_i$ is fed into the micro-processor, enabling the it to derive for instance directory information from the signal, which may be used for controlling the position of the radiation spot. The information signal is provided as output signal 54 of the micro-processor 53.

When writing information on a record carrier having prerecorded servo tracks comprising position information, the information to be recorded is fed into the micro-processor 53 by a signal 55. The scanning device reads the position information from the servo tracks. The micro-processor 53 synchronizes the information to be written with the position information and generates a control signal which is connected to a source control unit 56. The source control unit 56 controls the optical power of the radiation beam emitted by the radiation source 43, thereby controlling the formation of marks in the record carrier 19. The synchronisation may involve the imposition of a fixed relation between the synchronisation patterns in the position information and synchronisation patterns present in the information signal to be recorded.

Figure 6:
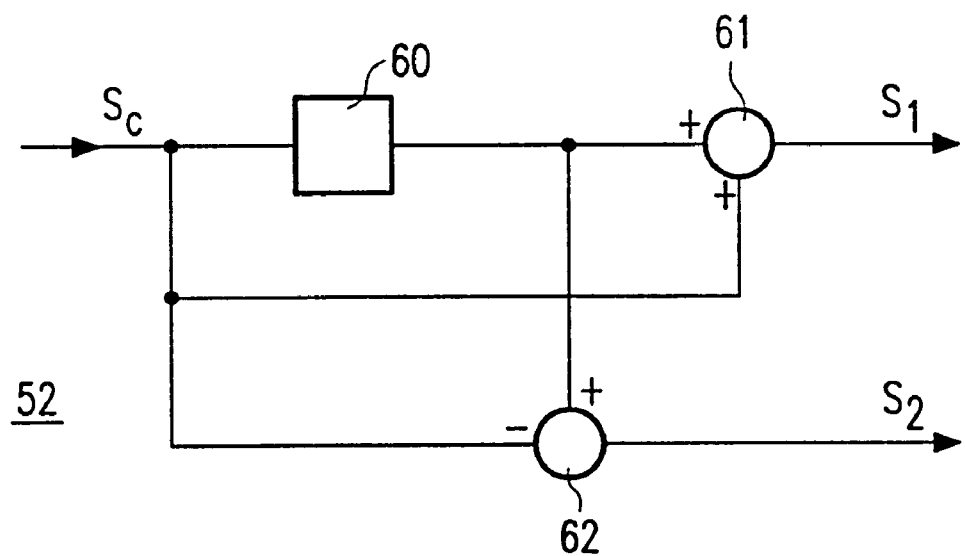
FIG. 6 shows a decoder of the scanning device.

FIG. 6 shows an implementation of the decoder 52. The three-valued output signal $S_c$ of the phase comparator 51 is connected to a delay line 60. The 'b' bit of a pair of channel bits 'a','b' fed into the delay line, is delayed by a duration of a channel bit. The output of the delay line 60 is combined in an adder 61 with the 'a' bit. The value of output signal $S_1$ of the adder 61 represents the position information of a fist servo track. A subtracter 62 subtracts the 'a' bit in signal $S_c$ from the delayed 'b' bit in the output signal of the delay line 60. The value of output signal $S_2$ of the subtracter 62 represents the position information of a second servo track. A value of +1 or +2 of signals $S_1$ and $S_2$ is assigned the logical value '1', a value of −1 or −2 a logical '0', whereas a value of 0 indicates the absence of position information. As an example, a channel bit pattern of −1, −1 in signal $S_c$ results in a value of −2 for $S_1$ and a value of 0 for $S_2$, corresponding to a logical information bit '0' in the first servo track and absence of information in signal $S_2$. A channel bit pattern +1, 0 results in the values +1 for S1 and −1 for S2, corresponding to the logical values '1'and '0' respectively. The decoder 52 decodes all track modulation or channel bit patterns in Table III to information bit values in the first and second servo track.

Figure 7:
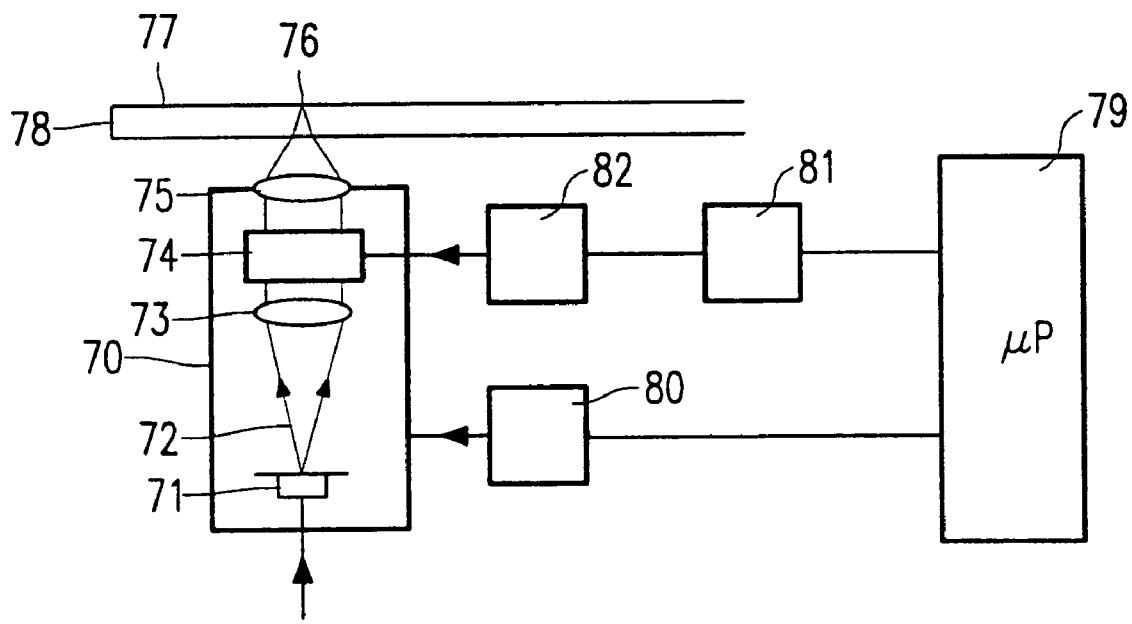
FIG. 7 shows an apparatus for manufacturing record carriers.

FIG. 7 shows an apparatus for manufacturing a record carrier according to the invention. The apparatus comprises an optical system 70, in which a radiation source 71 generates a radiation beam 72, which is guided through a collimator lens 73, a modulating unit 74 and an objective lens 75 to a radiation spot 76 on a radiation-sensitive layer 77 of a record carrier 78. A micro-processor 79 controls an actuator 80, which controls the position of the optical system 70 with respect to the record carrier 78. If the record carrier is disc-shaped, the actuator controls the radial position of the optical system. The tangential position of the radiation spot 76 on the record carrier is controlled by a drive, not shown in the Figure, which rotates the record carrier. The radiation spot 76 writes servo tracks in the form of a series of adjacent circular tracks or a series of 360° turns of a continuous spiral line.

During writing on the record carrier, the micro-processor sends position information to be recorded in the servo tracks to an encoder 81. The encoder 81 encodes the position information to a channel-bit pattern according to a group of first words or a group of different second words, the first and second words being used for alternating servo tracks. The groups of channel bit words used for the first and second servo tracks are given in Table I. The channel bit pattern formed by the encoder 81 is transformed into a control signal by a modulator 82. The modulator transforms each channel bit into one or two periods of a non-phase-shifted or 180° phase-shifted sinewave according to the rules described in connection with Table I. The control signal is used to control the operation of the modulating unit 74. The modulating unit modulates the radiation beam such that the desired modulation of the servo track is achieved. If the radial position of the servo track is to be modulated, the modulating unit 74 will be a deflection unit, such as an acousto-optic device, changing the direction of the radiation beam, and therewith the position of the radiation spot 76 in a direction perpendicular to the direction of the track. If the width instead of the position of the servo track is to be modulated, the modulating unit 74 may be a device having an controllable transmission of the radiation beam, thereby controlling the amount of radiation energy deposited on the record carrier 78. A large amount of energy will result in a wider servo track than a small amount of energy. In that case the modulating unit 74 may be integrated with the radiation source 71, forming a source of which the radiation output power can be controlled.

After the record carrier has been irradiated as described in the foregoing, it is subjected to an etching process to remove the portions of the radiation-sensitive layer 77 which have been exposed to the radiation beam 72, yielding a master disc in which a groove is formed which exhibits a wobble. If the consecutive tracks are numbered, the wobble in the even-numbered tracks is modulated in conformity with channel bit patterns from the group of first words, and the wobble in the odd-numbered tracks is modulated in conformity with channel bit patterns from the group of second words in the code table. From this master disc replicas are made on which the recording layer 6 is deposited. In record carriers of the inscribable type thus obtained, the part corresponding to the part of the master disc from which the radiation sensitive layer 77 has been removed is used as servo track (which may be either a groove or a ridge).

What is claimed is:

1. An optical record carrier comprising: a recording layer for recording information in a pattern of optically detectable marks in substantially parallel tracks, the tracks including alternating first and second servo tracks, the servo tracks including position information indicated by track modulation on both sides of a track different from the information pattern, and the position information in the first servo tracks is encoded into a group of m first words of channel bits and the position information in the second servo track is encoded into a different group of n second words of channel bits, where m and n are integers, all first words are different and all second words are different.

2. The optical carrier according to claim 1, wherein a first word is not a member of the second group.

3. The optical record carrier according to claim 1, wherein the tracks from a repeated succession of one of the first servo tracks, a non-servo track, one of the second servo tracks and a non-servo track.

4. The optical record carrier according to claim 1, wherein each word includes at least two channel bits, and each value of a channel bit is represented by a unique track modulation pattern, independent of the servo track.

5. The optical record carrier according to claim 3, wherein the track modulation pattern is a sinusoidal variation of at least one period of position or width of the servo track, and the values of a channel bit are represented by the phase of the variation with respect to clock marks in the track modulation.

6. A method of scanning a record carrier having substantially parallel tracks including alternating first and second servo tracks, the servo tracks including position information indicated by track modulation of both sides of the track different from the information pattern, comprising the steps of:
   when scanning the first servo track, deriving the position information from the modulation of the first servo track in which the position information is encoded into a group of m different first words of channel bits; and
   when scanning the second servo track, deriving the position information from the modulation of the second servo track in which the position information is encoded into a different group of n second words of channel bits, where m and n are integers.

7. The method according to claim 6, wherein the tracks form a repeated succession of:
   one of the first servo tracks,
   a non-servo track,
   one of the second servo tracks, and
   a non-servo track, and
   when scanning one of the non-servo tracks, the position information is derived from the modulation of the first or second servo track.

8. An apparatus for scanning a record carrier, comprising:
   an optical system for scanning first and second servo tracks, contained in a recording layer of the record carrier for recording information in substantially parallel tracks, using a radiation beam:

a detector for detecting the radiation beam reflected from the record carrier and modulated by a track modulation on both sides of the first and second servo tracks; and a signal processor for deriving a position-information signal from an output signal of the detector and including:

a demodulator for recovering a channel-bit pattern from the output signal of the detector; and a decoder for deriving the position-information signal from one of the first and second servo tracks which is encoded into a group of first and second code words of channel bits by decoding the channel-bit pattern according to one of the group of first and second code words, depending on whether one of the first or second servo tracks is being scanned.

9. The apparatus according to claim 8, wherein the apparatus is adapted for an information carrier in which tracks form a repeated succession of the first servo track, a non-servo track, a second servo track and a non-servo track, the optical system is adapted for scanning servo tracks and non-servo tracks, and the decoder is adapted to derive the position information from the track modulation of the first or second servo track when scanning one of the non-servo tracks.

10. An apparatus for manufacturing a record carrier, comprising:

an optical system for scanning a radiation-sensitive layer of a record carrier by a radiation beam along a path corresponding to servo tracks, modulated on both sides, to be formed in the radiation-sensitive layer;

a modulation unit for modulating the radiation beam in such a way that the pattern formed by the radiation beam corresponds to a control signal applied to the modulation unit;

an encoder for encoding position information into a channel-bit pattern according to a group of first words or a different group of second words, the first and second words being used for alternating servo tracks; and a modulator for deriving the control signal from the channel-bit pattern;

wherein the optical system includes a means for forming the servo tracks and a radiation beam for recording position information in the radiation-sensitive layer of the record carrier.

11. A method for manufacturing record carriers, comprising the steps of:

encoding position information into a channel-bit pattern according to a group of first words or a different group of second words, the first and second words being used for alternating servo tracks;

deriving the control signal from the channel-bit pattern;

scanning a radiation-sensitive layer of a record carrier by a radiation beam along a path corresponding to servo tracks, modulated on both sides, to be formed in the radiation-sensitive layer;

modulating the radiation beam in such a way that the pattern formed by the radiation beam corresponds to a control signal applied to a modulation unit; and forming the servo tracks and recording position information in the radiation-sensitive layer of the record carrier.

* * * * *